(12) United States Patent
Yeganeh

(10) Patent No.: US 7,968,160 B2
(45) Date of Patent: Jun. 28, 2011

(54) VACUUM THERMAL INSULATION WITH INFLATABLE LOAD-CARRYING STRUCTURE

(76) Inventor: Mehdi Yeganeh, Tehran (IR)

( * ) Notice: Subject to any disclaimer, the term of this patent is extended or adjusted under 35 U.S.C. 154(b) by 254 days.

(21) Appl. No.: 11/861,319

(22) Filed: Sep. 26, 2007

(65) Prior Publication Data

US 2009/0081395 A1    Mar. 26, 2009

(51) Int. Cl.
*B29D 22/00* (2006.01)
*B29D 22/02* (2006.01)
*F25D 11/00* (2006.01)
(52) U.S. Cl. .......... 428/34.1; 52/2.11; 62/440; 206/423; 220/522; 428/68; 428/69
(58) Field of Classification Search .................. 428/34.1, 428/68, 69; 52/2.11; 62/440; 206/423; 220/522
See application file for complete search history.

(56) References Cited

U.S. PATENT DOCUMENTS 5,270,092 A * 12/1993 Griffith et al. .................. 428/69
6,108,980 A *  8/2000 Braun ............................ 52/2.16

* cited by examiner

*Primary Examiner* — Brent T O Hern
(74) *Attorney, Agent, or Firm* — Barry Choobin; Choobin & Choobin Co & Consultancy L.L.C.

(57) ABSTRACT

A vacuum thermal insulation comprises an inflatable load-carrying structure and gas impermeable envelope with proper gates for inserting pressurized air into the structure and an evacuating vacuum chamber wherein, pressurized air is used for inflating and stiffening the load-carrying structure in order to prevent scrunching the envelope due to the atmospheric pressure. Thereby, producing vacuum in locations which are out of structure.

7 Claims, 6 Drawing Sheets

US 7,968,160 B2

VACUUM THERMAL INSULATION WITH INFLATABLE LOAD-CARRYING STRUCTURE

TECHNICAL FIELD OF THE INVENTION

The present invention relates to vacuum thermal insulation and methods for manufacturing the same.

SPONSORSHIP STATEMENT

The present invention is sponsored by Iranian National Science foundation.

BACKGROUND OF THE INVENTION

The increasing attention to the environmental issues has led to new regulations to limit energy consumption. These measures as well as the rise continuation of the cost of energy are having significant impact on energy consumers, which have been pushed either to optimize existing technologies or adopt new technical solutions to reduce energy consumption. Modification of insulation methods to reduce heat loss or heat entry is one of these solutions.

It is well known that a vacuum acts as a barrier to heat flow, and hence, certain insulating materials have included a vacuum or partial vacuum to increase their heat insulating effect. Application of vacuum insulations, which have insulation efficiency up to 7 times better than conventional insulating materials, offer the potentials for significant improvement in the overall performance of the insulated systems. Improved insulating efficiency can reduce wall thickness, improve useful volume in a given application, and reduce operational costs by reducing energy inputs. Now there is a rapidly emerging need for much improved vacuum insulation in terms of a combination of better insulation effectiveness, lighter weight, thinner, more durable, and more bendable or formable insulation products. Vacuum insulations can be used in a variety of different applications, such as refrigerators, vending machines, cold stores, refrigerated/insulated transportation, storage containers, building insulations, space-related vehicles and equipments, and extremely low-temperature cryogenic vessels and pipes.

BRIEF SUMMARY OF THE INVENTION

Vacuum insulations are sealed vacuum containers. Since the inside pressure of vacuum insulation is very low, therefore the atmospheric pressure tends to scrunch the vacuum container. In vacuum insulation it is a common practice to use built in structure for carrying the load of atmospheric pressure and prevents such scrunching. A wide variety of load-carrying structures (core) such as corrugated cardboard, corrugated or honeycomb panels, plastic foam, and silica powder are introduced and used in vacuum insulation.

In vacuum insulation the insulating efficiency will depend upon the extent of the vacuum, as well as the configuration of the load-carrying structure (core), including the amount of continuous structural contact between the opposing surfaces, because such structural contacts will result in heat conduction between the surfaces. The core should have low heat conductive properties so it will not substantially affect the benefit of the vacuum in terms of resistance to heat transfer.

An object of the present invention is the provision of a light-weight, inexpensive thermal vacuum insulation with inflatable load-carrying structure, which omit the need for the conventional core material. In such insulation, pressurized air is used for inflating and stiffening the load-carrying structure in order to prevent scrunching the envelope. By inflation of this structure, the vacuum is produced in locations which are out of structure. With this design the vacuum insulation can be produced by flexible materials thus could be foldable in non-operational conditions, when the structure is deflated. In operational condition the structure will be stiffened by entering high pressure air, so the structure would be able to carry the atmospheric load.

Another object of the present invention is the provision of an inflatable load-carrying structure for use in a vacuum insulation which is easily fabricated at an inexpensive cost.

It is also an object of the present invention to provide an inflatable load-carrying structure for use in a vacuum insulation which has sufficient mechanical strength to withstand atmospheric pressure, while minimizes heat transfer through conduction and hence improves the thermal effectiveness of insulation.

A specific object of the present invention is the provision of an inflatable load-carrying structure for use in a vacuum insulation which could be deflated to reduce the insulation volume at non-operational condition and inflated by entering pressurized air on site.

BRIEF DESCRIPTION OF THE DRAWINGS

The accompanying drawings together with the detailed description of the preferred embodiments of the invention make apparent other objects and feature of the present invention. It is noted that the drawings are designed as illustrations, which only explain the principles of the invention and not as a definition of the limits of the invention. In the drawings.

DESCRIPTION OF THE PREFERRED EMBODIMENTS

Figure 1:
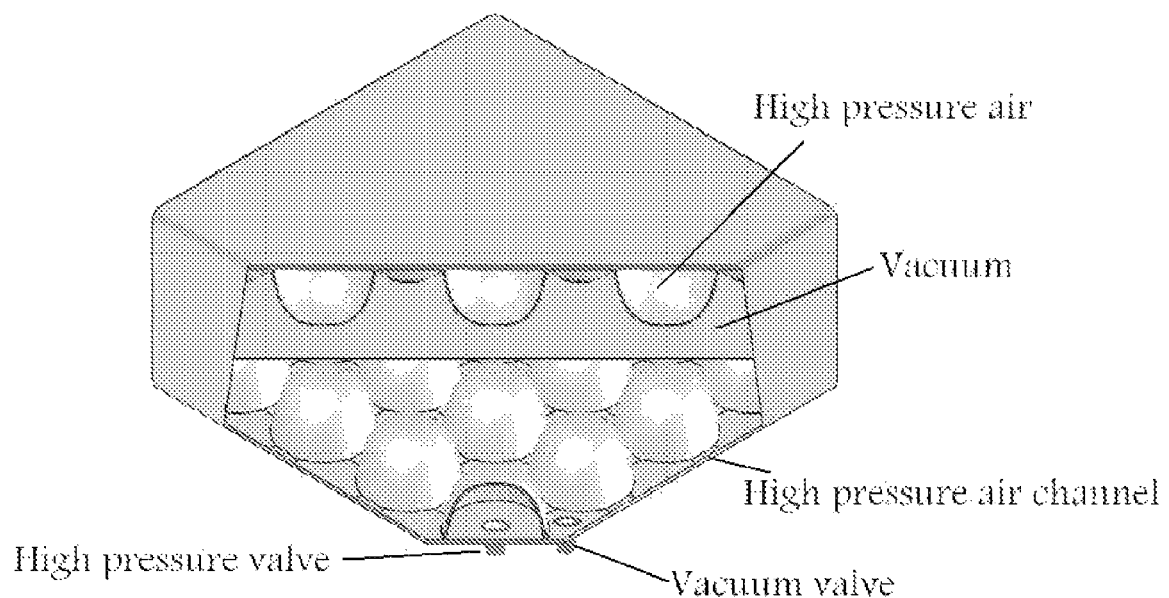
FIG. 1 is a partially exploded view of preferred embodiment of the present invention.

While this invention is susceptible of embodiment in many different forms, there is shown two embodiments of the invention in the drawings and will hereinafter be described in detail the preferred one, with the understanding that the present disclosure is to be considered as an exemplification of the principles of the invention and is not intended to limit the invention to the embodiments illustrated.

FIG. 1 is a partially exploded perspective view illustrating the preferred embodiment of the invention. As it could be seen from this figure, a sheet of this insulation has different layers. Flat layers are positioned at two outer sides and the center of the insulation and two bulged layers between these layers are attached at the contact surfaces. These layers are made of impermeable and flexible plastic. In operational condition there is pressurized air into the bulges (load-carrying structure), in which enables the structure to withstand the load from atmosphere pressure. It is noted that if pressurized air of the bulges are evacuated, the insulation will be scrunched due to the atmospheric pressure acting on outer surfaces. This ability causes the insulation to have small volume in non-operational condition, which makes easy its transportation. In order to make the insulation operational, pressurized air has to be entered into the structure through the proper valve. The high pressure valve is depicted in FIG. 1. The other valve in this figure is vacuum valve. Through this valve the remaining air of the vacuum chamber would be evacuated. After evacuation the vacuum chamber, heat could be transferred mainly (1) by conduction through bulges wall and pressurized air into the bulges, (2) by radiation through the evacuated space; and (3) by convection by means of the gas molecules remaining in the evacuated space. It is noted that one may use dried air or any other proper gases for minimizing the permeation ratio, which yields to better maintaining the long term thermal efficiency of the insulation. Also, it is desirable to employ getter and desiccant material within the interior volume of the insulation because of gas permeation occurring almost exclusively through plastic edges as well as the walls. Adsorbents are normally effective in removing from the evacuated space gases such as hydrocarbons and atmosphere gases such as oxygen, nitrogen, and water vapor. Water is very strongly held by the commonly used adsorbents such as zeolite molecular sieve or activated carbons.

Figure 2:
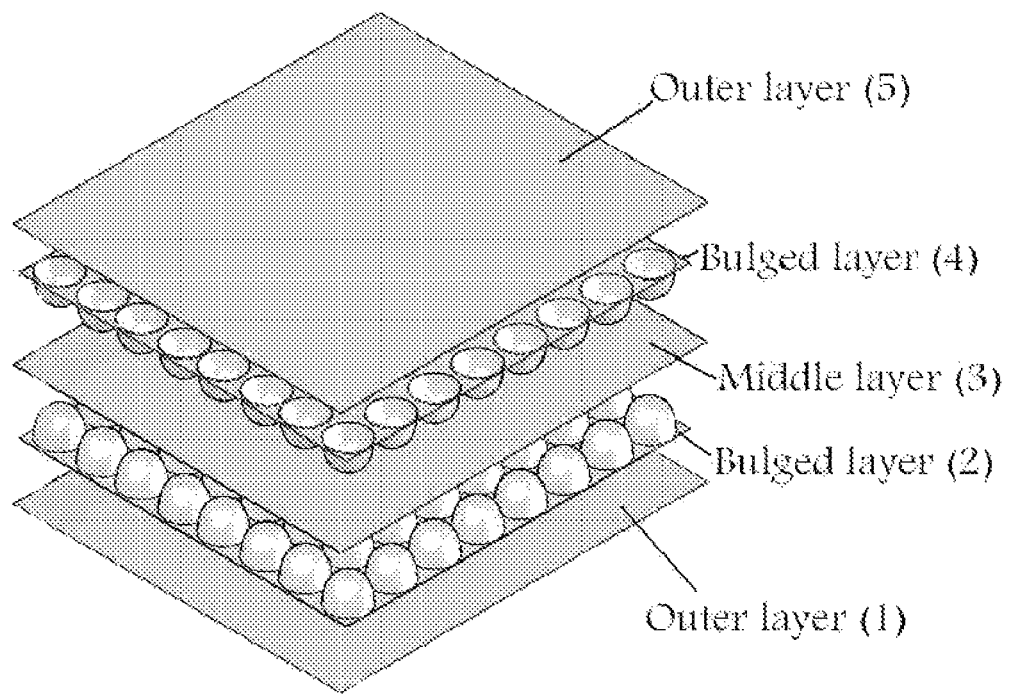
FIG. 2 shows different layers of the proposed vacuum insulation.
Figure 3:
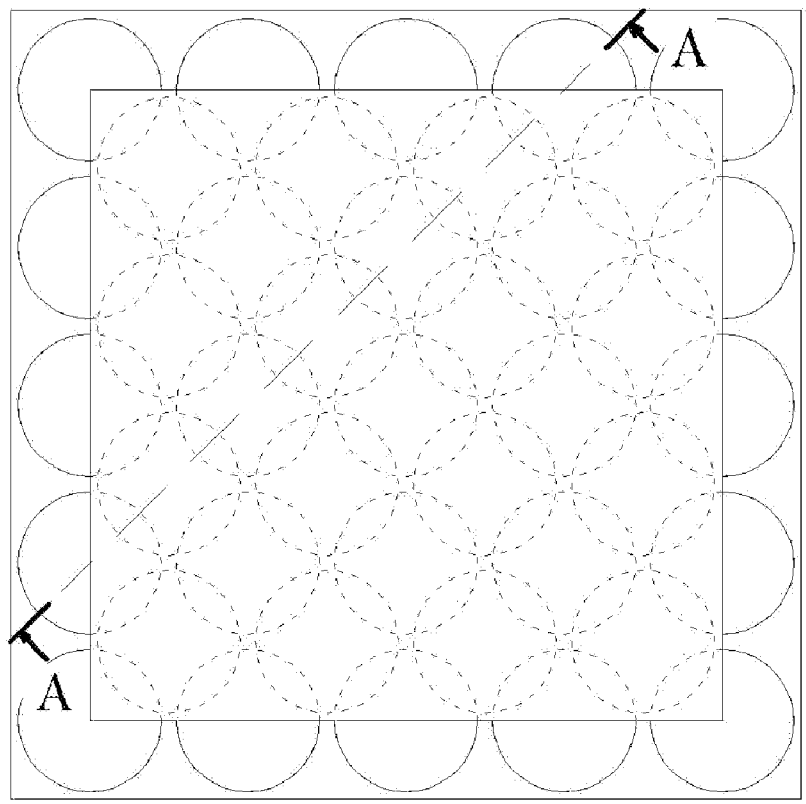
FIG. 3 shows the top view of preferred embodiment of the present invention.
Figure 4:
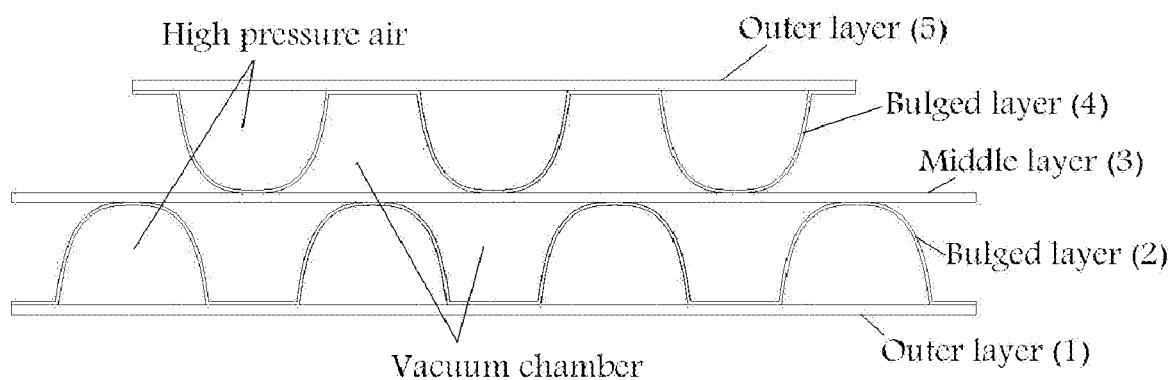
FIG. 4 is the cross-sectional view of the present article taken along the line A-A of FIG. 3.
Figure 5:
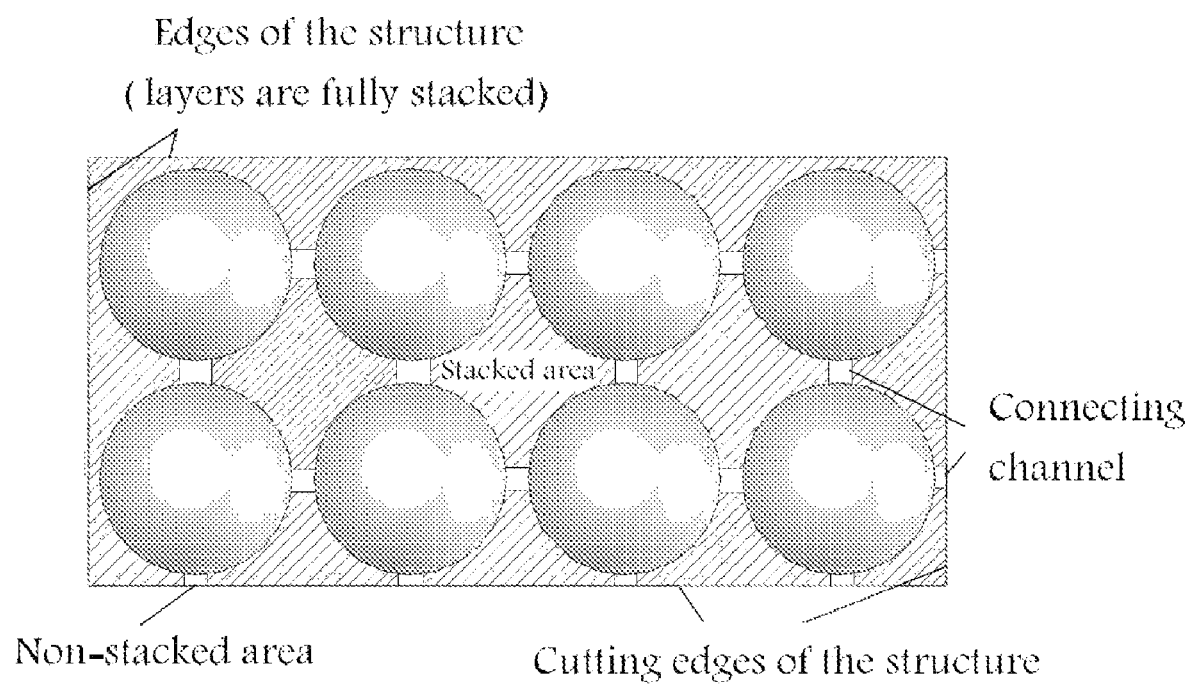
FIG. 5 indicates stacked areas of layers 1 and 2, and layers 4 and 5 of FIG. 2.

The exploded view of the proposed insulation is shown in FIG. 2. Different layers of the insulation are separately depicted in this figure. With respect to FIG. 2, an insulation has a bulged layer 2 arranged between an outer layer 1 and a middle layer 3. The bulged layer has pluralities of inflatable cores into which air is passed to inflate cores or the air removed to deflate the cores. Another bulged layer 4 with cores and an outer layer 5 are stacked over the middle layer 3 to have insulation. In FIG. 3 the top view of the insulation is depicted to show the positioning of bulged layers with respect to each other. It is noted that the bulges of the neighboring layers are not co-axial. FIG. 4 is a cross-sectional view showing the lateral view of the insulation along the line A-A indicated in FIG. 3. According to FIG. 4 it is observed that the bulges of one layer are indirectly connected to the bulges of opposite layer through the middle flat layer. This arrangement increases thermal resistance of the insulation in lateral direction because of extension of the heat conduction path. As illustrated, a sheet of this insulation has three flat and two bulged layers. It is assumed that all of these layers are made of flexible impermeable plastic sheet. The thickness of the impermeable layer will vary, depending on the dimension of the bulges and the required strength of them, which is a function of the inside pressure. To produce the load-carrying structure, layers 1 and 2, and layers 4 and 5 are stacked to each other in contact surfaces as shown in FIG. 5. These layers are thermo-welded to each other. As it is shown in FIG. 5, the contacted surfaces of these layers are not fully stacked for making connecting channels. Through these channels high pressure air can flow between bulges.

Referring to FIG. 4 it could be concluded that the thermal efficiency of the proposed thermal insulation is affected by direct contact between outer layers 1 and 5, and the amount of vacuum between these layers. The thermal efficiency can be improved by providing greater chamber for vacuum with respect to total volume of the insulation, while minimizing direct structural contact between outer layers. This means, decreasing the bulge's area to total area of the insulation which is denoted by the ratio $A/A_{total}$, increases the thermal efficiency. It should be noted that the required magnitude of the inside pressure to provide the force for withstanding the atmosphere load, depends on the ratio $A/A_{total}$. Therefore, the structural strength must be considered to determine the optimum ratio of $A/A_{total}$.

Referring to figures disclosed herewith, it can be concluded that the aforementioned embodiment can construct with only one bulged layer and two outer layers. In such an embodiment the pressurized air of bulges produced direct contact between outer layers which reduce the thermal efficiency of the insulation. It should be understood that an article of insulation could be made using the same principles as outlined above, except with two or more several successive layers of the article which are positioned in such a manner as the article of FIG. 2. FIG. 1 and FIG. 2 show the embodiment with two successive layers. Such arrangement provides an increase in insulation efficiency, and protection relative to loss of vacuum due to puncture, etc. of one or more of the bulges or vacuum chamber in the article.

As illusteraed in FIGS. 1-4 all of the inflatable cores, bulged layer (4) and bulged layer (2), in the load carry structure can be spaced from each other within each layer aid from layer to layer. All of the inflatable cores in the at least one bulged layer, bulged layer (4) aid/or bulged layer (2), can be of substantially the same shape and size and uniformly spaced from each other. Middle layer (3) provides spacing between the layers by preventing bulged layer (4) aid bulged layer (2) from directly contacting each other.

Figure 6:
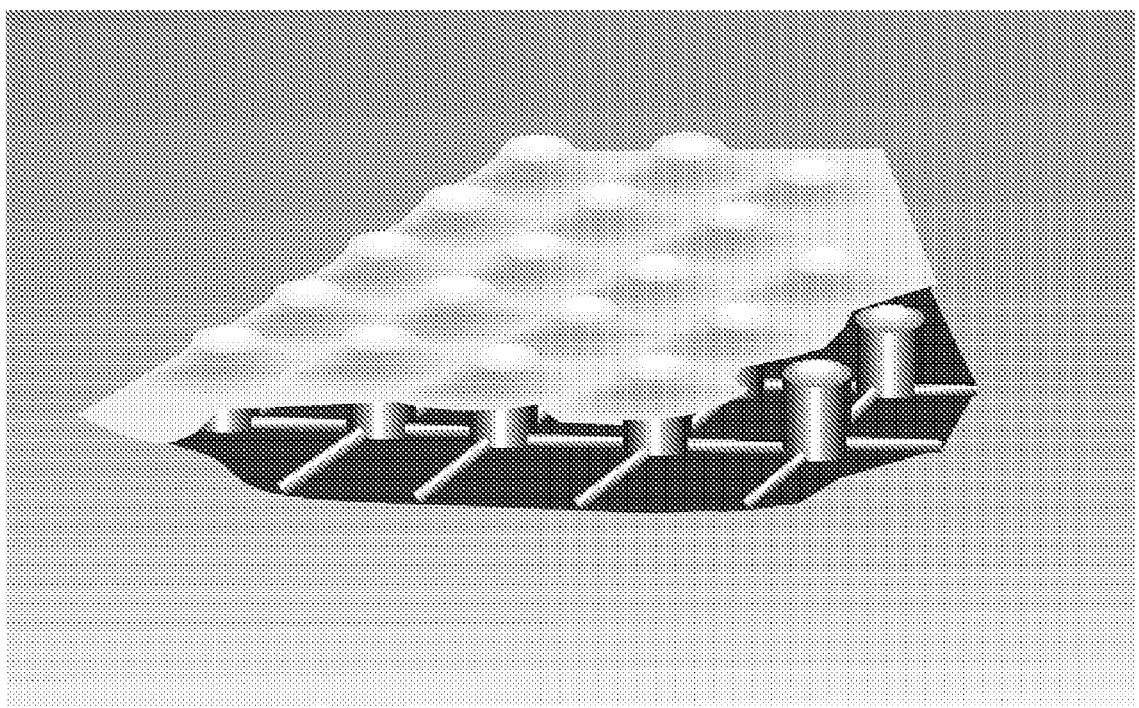
FIG. 6 illustrates another embodiment of the present invention with inflatable load-carrying structure, which is comprised of a layer with columns and connecting channels.
Figure 7:
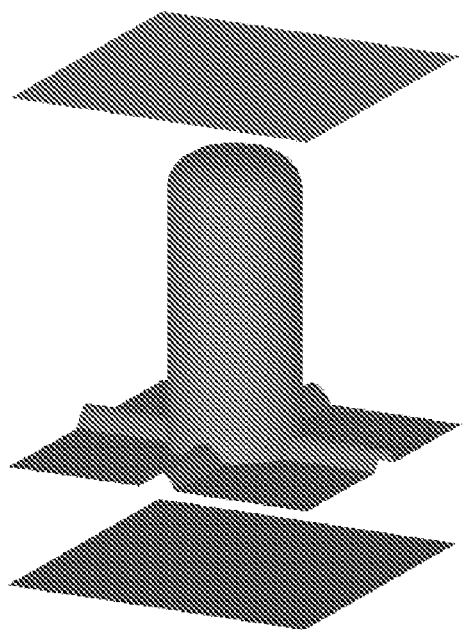
FIG. 7 is a partially exploded view showing the elements of one embodiment of the article of insulation illustrated in FIG. 6.

As is known to those skilled in the art, it is feasible to fabricate inflatable structure with any shape that could recover the designed shape and stiffened when inflated by the inside pressure. FIG. 6 illustrates another embodiment of the present invention with inflatable load-carrying structure, which is comprised of a layer with columns and connecting channels. An exploded view of one element of the article of FIG. 6 is illustrated in FIG. 7. Enhancements to the embodiment of FIG. 6 may also be provided using multiple panels to increase the thermal efficiency.

Insulation with inflatable load-carrying structure according to the present invention can be used not only for flat shapes such as elliptical, square and orthogonal, but also for insulation with cylindrical, spherical or any other three dimensional shapes. In such cases the structure should be designed in a manner that could recover the desired shape after inflation. The ability to be manufactured in different forms and shapes including multi-layer or curved insulation is an advantage of the present invention. Another advantage of the present invention is the provision of an inflatable vacuum insulation which has small volume in non-operational condition. This insulation can be temporarily deflated by removing high pressure air from its structure to reduce the volume of the insulation. The reduction in volume significantly increases the convenience and reduces the expense of transportation of the insulation. At its destination, by entering high pressure air into the structure, the insulation could be inflated to its operational shape. One of advantages of the proposed vacuum insulation is the ability of draining the air inside the vacuum chamber trough the vacuum gate. Yet another advantage of the present invention is the provision of an inflatable vacuum insulation which has low weight with respect to other types of vacuum insulations and could be produced in inexpensive and convenient manufacturing process. Needless to filling material for carrying the load of atmospheric pressure is another important advantage of this invention, which significantly reduces the cost of row materials. However, the thermal conductivity coefficient of the proposed insulation is low, if it needs there is the ability to increase the thermal conductivity coefficient by changing the distance between outer surfaces of the insulation by decreasing the inside air pressure. Having the ability of no limited deflation and inflation, the proposed insulation is proper for cases of periodical usage with short time of application.

Example 1

It is well known that in vacuum insulations the insulating effect will depend upon the extent of the vacuum, as well as the configuration of the remainder of the structure, including the amount of continuous structural contact between the opposing surfaces. Such structural contact will result in heat conduction between the surfaces. The proposed insulation is analyzed to investigate the effect of such parameters on thermal characteristics. Also the state of stress in the structure under the atmospheric and inside pressure loading is studied.

Structural Analysis

In the proposed insulation, bulges are main parts of the load-carrying structure. The bulges' area to total area determines the required inside pressure of structure to inflate the insulation. This ratio is the main parameter affecting the thermal efficiency of insulation. In other words the greater inside pressure of structure leads to a smaller required bulge area, which yields to a greater vacuum area and therefore higher thermal efficiency. In the case presented here this ratio is equal to 4, which means the inside pressure of structure is 0.4 MPa (four times the atmospheric pressure). The minimum area of bulges to total area of the insulation must be determined in a way that the structure could carry the load of atmospheric pressure. The main dimensions are considered as follows:
Radius of the bulge's root: 8 mm
Minimum required bulge's radius: 5 mm
Height of the bulge: 10 mm
Width of the connecting channels: 3 mm
Center to center distance of the bulges: 17.7 mm
Thickness of the bulge's layer: 0.35 mm
Thickness of the flat layer: 1 mm Above dimensions indicate that the minimum required bulge's radius is 5 mm. As it is seen from the cross-sectional view of insulation FIG. 4 in some parts of the bulge near to the peak, the radius is less than 5 mm. It should be noted that flexibility of middle layer 3 and approaching bulged layers to each other adjusts the required force for acting against the atmospheric pressure.

Figure 8:
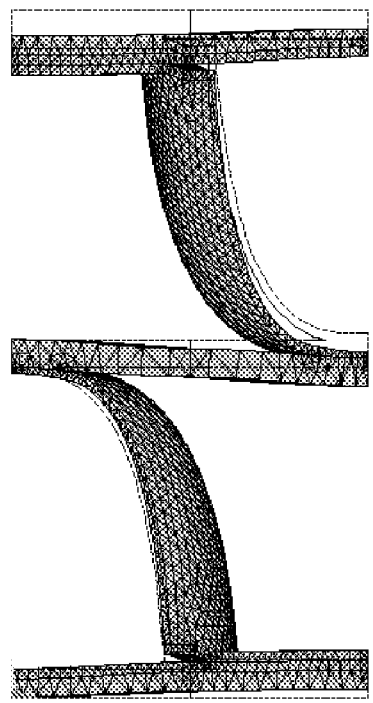
FIG. 8 shows the deformed shape of a cutting-in of an element of the insulation illustrated in FIG. 1 due to the load of atmosphere pressure and the pressurized air into the structure.
Figure 9:
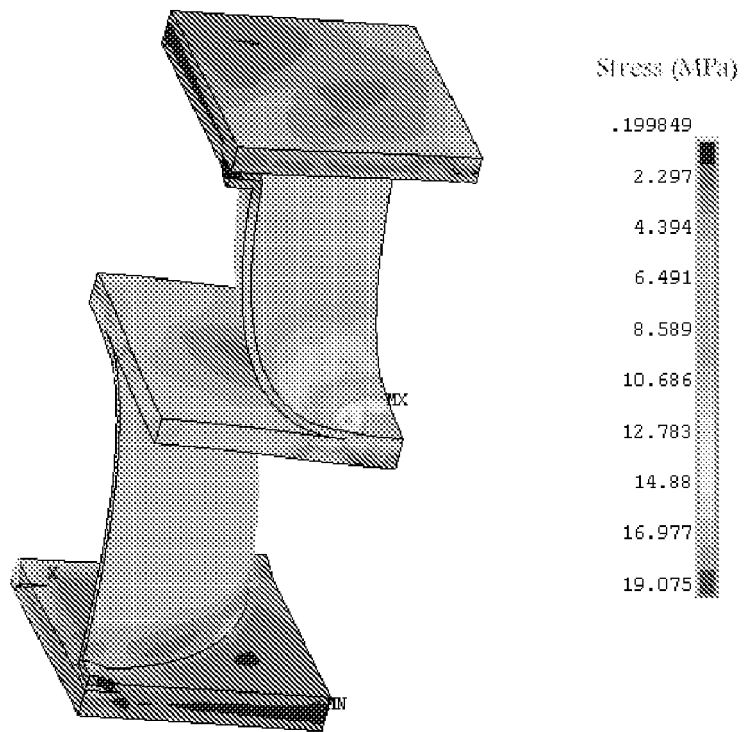
FIG. 9 illustrates the von Misses stress distribution under the loading of atmosphere pressure and the pressurized air into the structure.

Due to the application of high pressure air into the structure together with the load of atmosphere, it requires to investigate the stress response of insulation to verify the structural strength. In this study it is considered that the barrier material has the mechanical and thermal properties as Mylar "350SBL300", marketed by DuPont. This barrier material is flexible and has low thermal conductivity. Also, due to reflecting layers this material has high resistance to radiation heat transfer. Characteristics of Mylar "350SBL300" is as follows:
Modulus of elasticity: 510 MPa
Yield stress: 25 MPa To study the stress response a part of the insulation is selected for numerical calculations. To minimize the calculations, the smallest acceptable model is selected based on the symmetry of the component. The applied pressure on the inner surface of bulges and outer surface of the envelope are equal to 0.4 MPa and 0.1 MPa, respectively. FIG. 8 shows the deformed shape together with undeformed edges of a cutting-in of an element of the insulation illustrated in FIG. 1 due to the load of atmosphere pressure and the pressurized air into the structure. The von Misses stress distribution in the considered model is shown in FIG. 9. According to FIG. 9 it is observed that the maximum magnitude of the von Misses stress is equal to 19 MPa, which is produced in the junction zone of the bulge's peak and middle layer. Considering the yield stress of material (25 MPa), it could be concluded that mechanical strength safety factor of the proposed insulation is about 1.3. According to the geometry of structure it could be concluded that the magnitude of stress increases as the inside pressure and bulge's radius increases. Therefore, to minimize magnitudes of stresses one may decrease the bulge's radius for constant ratio of the bulge's area to total area. This change could decrease the stress magnitude without changing the thermal efficiency.

Thermal Analysis

Assuming that the vacuum container is fully evacuated, heat transfer in the proposed insulation occurs in the following modes:

1—Convection by the inside air of structure. According to the geometry of insulation the inside air of structure (bulges) makes a volume that could transfer heat by convection. Since bulge volume is rather small, for simplifying the calculations, in this study it is assumed that the amount of the heat transferred by convection is negligible with respect to other ways of heat transfer.

2—Heat conduction by the structure's medium and the inside air of structure is another way of heat transfer in this insulation. According to the distribution of vacuum, conduction is the main way of heat transfer in the proposed insulation. Outer surfaces of the insulation are connected through bulges and middle layer between the structure layers. The insulation's material has large resistance to heat transfer. Heat conductivity of Mylar "350SBL300" is 0.155 W/(mK). As it is observed from FIG. 4 bulges of opposite layers are not connected directly. The cutting view of layers shows that bulges of opposite layers are connected through the middle layer 3, which makes a great resistance for heat conduction between opposite bulges. According to the small volume of bulges, the inside air of structure is mainly transfer heat by conduction rather than convection. Heat conductivity of the air is 0.024 W/(mK). It is noted that the inside air pressure (0.4 MPa) does not have an important effect on the conductivity coefficient.

3—Radiation is also a possible mode for heat transfer. As the barrier material has anti-radiation layers, therefore, this insulation has a proper resistance to heat radiation.

Figure 10:
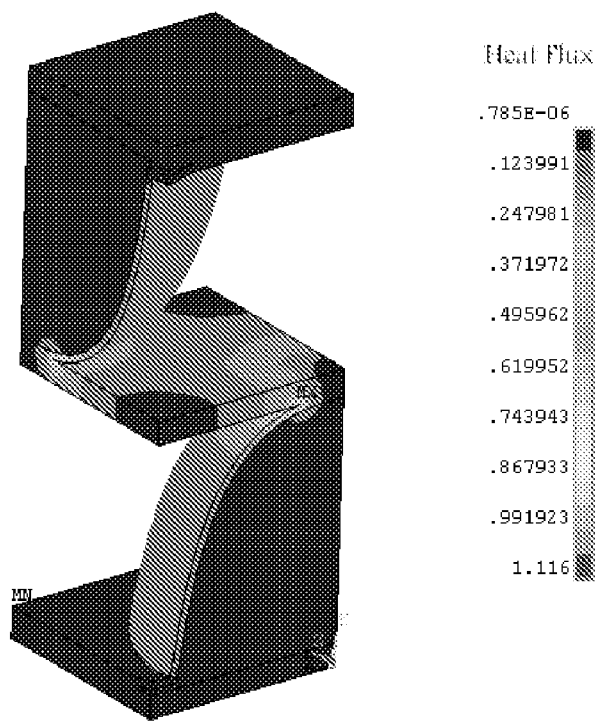
FIG. 10 is a graphical representation of flux of heat transferred through the insulation due to a thirty Celsius degree of temperature difference between the outer surfaces.
Figure 11:
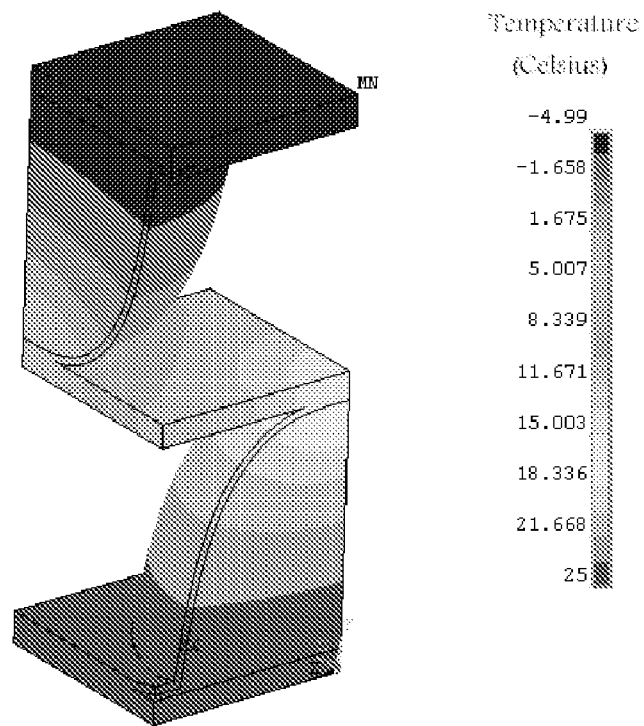
FIG. 11 shows the temperature distribution in the cutting-in of an element of the insulation when the insulation installed between two environments with temperatures of 25 and −5 degrees in Celsius.

In conclusion the main phenomenon responsible for heat transfer in the proposed insulation is heat conduction through the medium and pressurized air within the structure. Therefore in this investigation for simplifying calculation only the conduction is considered and the other modes of heat transfer are neglected. For calculating the thermal conductivity of insulation uniform heat fluxes with opposite signs (0.01 W/mm$^2$ and −0.01 W/mm$^2$) are applied to outer surfaces. The temperature of the lower surface of the insulation is considered constant and equal to 25° C., and the problem is solved in steady state condition. FIG. 10 and FIG. 11 respectively show the heat flux contour and temperature distribution in the model.

The results show that the temperature of the outer surface is equal to −5° C. The area of the considered unit is equal to 78.3 mm² and its thickness is equal to 24.14 mm. Since the temperature difference between two surfaces of the insulation is 30° C., the thermal conductivity of the insulation is approximately 0.001 W/(mK).

Considering the obtained results it is concluded that the proposed insulation with embodiment shown in FIG. 1 has proper mechanical and thermal characteristics as an article of vacuum insulation.

Although a preferred embodiment of the insulation has been disclosed herein for illustrating the principles of the invention, it should be noted that various changes, modifications and substitutions may be incorporated in such invention without departing from the spirit of this type of insulation. Accordingly, it is intended by the appended claims to cover all such modifications and changes as fall within the true spirit and scope of the invention.

What is claimed is:

1. A refrigerator in combination with vacuum thermal insulation with inflatable load carrying structure comprising:
    two outer layers defining an evacuated space there between;
    at least one bulged layer including a plurality of inflatable cores arranged between the two outer layers to create an inflatable load carrying structure, wherein all of inflatable cores in the load carrying structure are spaced from each other, wherein all of the inflatable cores in the at least one bulged layer are substantially the same shape and size uniformly spaced from each other;
    a first valve for inserting pressurized air into the plurality of inflatable cores in the bulged layer;
    a second valve for evacuating an air from a space between the inflatable cores in the bulged layers to form a vacuum chamber; and wherein the second valve is openable to remove the air from the inflatable cores of the bulged layer to deflate the inflatable cores to enable a user to fold and transport the insulation;
    and the second valve being a vacuum valve for removing air remaining in the vacuum chamber, and wherein the vacuum thermal insulation has a mechanical strength safety factor of 1.3.

2. The refrigerator in combination with vacuum thermal insulation with inflatable load carrying structure according to claim 1, further comprising a plurality of intermediate layers arranged between the two outer layers.

3. The refrigerator in combination with vacuum thermal insulation with inflatable load carrying structure according to claim 1, wherein the shape of thermal insulation the inflatable core is circular, elliptical, hexagonal or any other regular shape.

4. The refrigerator in combination with vacuum thermal insulation with inflatable load carrying structure according to claim 1, wherein the inflatable cores of the bulged layer are inflatable by passing pressurized air into the inflatable cores to form an elliptical or circular or hexagonal or any regular three dimensional shaped cores.

5. The refrigerator in combination with vacuum thermal insulation with inflatable load carrying structure according to claim 1, wherein the first valve is openable to pass pressurized air into the inflatable cores of the bulged layer to form an inflatable load carrying structure to provide a greater chamber volume for vacuum with respect to total volume of insulation to improve a thermal insulation efficiency.

6. The refrigerator in combination with vacuum thermal insulation with inflatable load carrying structure according to claim 1, wherein the second valve is openable to remove air from the inflatable cores of the bulged layer to deflate the inflatable cores.

7. The refrigerator in combination with vacuum thermal insulation with inflatable load carrying structure according to claim 1, wherein pressure level of the pressurized air is above an atmospheric pressure level.

* * * * *